3,389,107
WAX-(PROPENE/BUTENE COPOLYMER) FILMS
Melvin V. Hunter, El Cerrito, and Victor A. Rundle, Oakland, Calif., assignors to Chevron Research Company, a corporation of Delaware
No Drawing. Filed June 21, 1965, Ser. No. 465,772
6 Claims. (Cl. 260—28.5)

ABSTRACT OF THE DISCLOSURE

Self-sustaining films formed from high molecular weight propene/butene copolymer and a major amount of wax.

---

This invention concerns novel wax polymer compositions which find use as films and coatings, particularly for packaging.

Waxes, particularly those derived from petroleum, have found wide application as coatings for wrapping paper. However, the wax tends to peel off and crack because of inherent shortcomings in its physical properties. Moreover, the waxes in themselves are much too brittle to form an independent stable film. Films of wax crack with only mild stresses, the wax film being incapable of being stretched or bent. Waxes combined with typical wax additive grade (low molecular weight) polyethylenes yield a material having good tensile strength as coatings, but lacking ability to elongate under stress.

It has now been found that wax films with excellent tensile properties can be prepared by combining wax and high molecular weight copolymers of propene and butene and extruding the compositions under usual film extrusion conditions. Accordingly, the extrudate is rapidly cooled to a temperature significantly below the melting temperature of the wax. The wax-copolymer compositions may also be extruded onto a variety of supports, e.g., paper, to provide wax coated films of enhanced physical properties.

In preparing the novel films of this invention, the wax and high molecular weight propene/butene copolymers may, optionally, be mechanically mixed prior to extruding in order to relatively homogeneously distribute the copolymer throughout the wax. The copolymer may be used in various physical forms: powder, pellets, compacts, or other convenient forms or size. The wax will generally be present in the form of a powder or crushable chunk in order to facilitate the mixing of the wax and the copolymer.

Although the wax and copolymer may be directly introduced into the extruder hopper without prior mixing, preferably, the wax-copolymer mixture is formed and then extruded in a pelletizer to form pellets of the wax-copolymer mixture. The pellets may then be introduced into a film extruder having a temperature at the extruder head or die above the wax-copolymer mixture fusion temperature; generally, this will be above the copolymer softening point, i.e., 250°–350° F. Usually, the extrusion temperature will be in the range of about 350°–500° F.

Various additives may be included with the wax-copolymer mixture, such as stabilizers, pigments, slip-agents, etc., depending on the particular use for the film.

As the extrudate leaves the die, it is rapidly cooled from the mixture's fusion temperature to a temperature at least about 150° F. below the fusion temperature, preferably, at least about 250°–450° F. below, to bring the temperature of the extrudate to about 30°–150° F., desirably 50°–135° F. The time period in which the extrudate is cooled from the melt temperature will generally be about 0.001 second to 2 seconds, more usually about 0.005 to 0.5 second. The cooling can be achieved by any convenient mechanical means, by depositing the extrudate on a cool surface, passing the extrudate into a cooling bath, etc.

The extruded film may be laid directly onto a chill roll or onto a support, e.g., paper, aluminum, etc. and then cooled, permitting sufficient time for the wax-copolymer film to adhere to the support. To permit rapid efficient cooling throughout the thickness of the film, the film thickness will generally be less than about 20 mils, usually in the range of about 0.1–10 mils, more usually in the range of about 0.5–5 mils.

The films thus formed have excellent flexibility, there being no evidence of cracking or flaking off of the wax when the film is bent or twisted. Moreover, the films show excellent impact strength and elongation, as well as yield strength, tensile strength and tear strength. For the most part, the films appear homogeneous and are clear or translucent. Furthermore, on standing they remain relatively free of blooming. Blooming is evidenced by the wax migrating to the surface and forming a waxy film on the surface. In many applications for packaging, the forming of this wax film on the surface is undesirable.

The film's physical properties, e.g., tensile strength, can be improved by orenting the film along the machine and/or transverse direction. Usually, the draw ratio in a single direction would be in the range of about 1–9:1, more usually in the range of about 1–6:1. When orienting in both directions, the draw ratio in each direction will generally be in the range of about 1–4:1.

As indicated, the conditions for extruding the wax-copolymer mixture will generally parallel those conditions for extruding polypropylene as film, except that the melt temperature will be lower. A discussion of extruding conditions is found in "Plastics Extrusion Technology," Allan L. Guff, Reinhold, 1962 and in Technical Report TR–9 March 1961, distributed by the Eastman Chemical Products, Inc., Plastics Division.

The copolymer which is used in the wax-copolymer composition will have from about 15 to 85 mole percent propene, usually from 25 to 75 mole percent propene. The polymer will generally be at least about 150,000 molecular weight and generally not exceed 2,000,000 molecular weight, more usually, the polymer molecular weight will be in the range of about 500,000 to 1,500,000. The polymer molecular weight in the films will be somewhat lower than the original molecular weight due to degradation during extrusion. However, due to the presence of the wax and the low temperature of extrusion, degradation will be relatively low. It is therefore presumed, as an approximation, that no significant degradation has occurred and the final molecular weight of the copolymer is the same as the initial molecular weight.

Usually, the polymers will be random copolymers, rather than alternating block or terminal block copolymers.

The polymer is readily prepared using "Ziegler-type" catalysts. These catalysts are combinations of a heavy metal salt and an organometallic compound of metals of Groups 1–3 of the periodic chart. Most usually, titanium and vanadium halides are used with organoaluminum compounds. More specifically, titanium trichloride and triisobutylaluminum are illustrative of the type of catalyst. The "Ziegler-type" polymerizations are well known in the art and do not require extensive exemplification here.

The wax used for the composition is a wax generally derived from petroleum sources or other wax having similar physical properties. This includes scale waxes, refined waxes and microcrystalline waxes, as well as combinations of these waxes. The wax will generally have an AMP ASTM D 127–60) of about 125 to 200, more usually of 140 to 220, and preferably of 145 to 175. The oil content will generally be low, usually less than about 10 percent and more usually less than about 5 percent.

The preferred wax is a refined wax, i.e., a wax which has been extracted with a suitable solvent to remove oil and other impurities.

The wax-copolymer composition will generally have from about 45 to 80 weight percent wax and from about 20 to 55 weight percent copolymer. More usually, the wax-copolymer composition will have from about 50 to 70 weight percent wax and 30 to 50 weight percent copolymer. Preferably, the lower amounts of polymer (20–30 weight percent) are used when the film is to be bonded to a support, although self-sustaining films are obtained throughout the indicated ranges in amounts of the copolymer and wax.

In many instances, it will be advantageous to have additives in the composition, e.g., stabilizers, adhesion and clarity improvers, etc. Generally, the additives will range from about 0 to 10 weight percent of the wax-copolymer composition.

Illustrative of various additives which may be included in the wax-copolymer composition are antioxidants: 2,2'-methylene - 4 - methylphenol, 2,6 - di - tertiarybutyl - 4-methylphenol, other alkyl-substituted phenols commercially available under the trade designation "Santonox"; color stabilizers: epoxidized fatty acids, triphenylphosphite, etc.; dyes; lubricants: calcium fatty acid salts; scuff resistance additives: polyethylene, chlorinated paraffins, modified rosins, etc. The amounts of the additives individually or together will rarely exceed 10 percent, usually not exceeding 5 percent by weight of the wax-copolymer composition. Generally, the weight of the additives individually will be in the range of about 0.001–2 weight percent of the wax-copolymer composition.

The following examples are offered by way of illustration and not by way of limitation.

EXAMPLE 1

Refined wax 160/165 AMP (70 parts) and 30 parts of propene/butene copolymer (to be described subsequently) were mixed in a Banbury mixer and the relatively homogeneous mixture heated to 400°–500° F. The fused composition was then used to form a film using a "draw down" procedure or "doctor-blade" method. The basic method is found in "Paint Testing Manual," 12th Edition, 1962 (H. A. Gardner et al.). The procedure was modified by heating the doctor-blade (Baker film applicator) and one end of the steel draw down blade to a temperature (400°–500° F.) which was above the melting point of the wax-copolymer blend.

The results of the physical property measurements of films prepared as described above appear in the following Table I. The results reported for elongation and tensile strength (stress at break) were determined according to ASTM D D882–56T (constant rate of grip separation). Testing speed: 5 inches per minute; distance between jaws: 2.5 inches; specimen width: 1 inch.

TABLE I

| Polymer | | Weight Percent of Composition | Film Thickness, Mils | Elongation at Break,[2] Percent | Stress at Break [2] (gms.) |
| --- | --- | --- | --- | --- | --- |
| C₃/C₄, mil Percent | M.W.×10⁶ | | | | |
| 25/75 | ~1.2 | 30 | 2 | 93 | ~1,000 |
| 50/50 | ~1.0 | 30 | 2 | ¹38+ | 1,000 |
| 75/25 | ~1.0 | 30 | 2 | 103 | 1,280 |

[1] Pinholes were present making the value reported a minimum.
[2] Films were stretched before testing.

In order to demonstrate that the compositions of this invention retain good flexibility at low temperatures, the properties of the samples were tested at varying temperatures in the manner described previously. The following table indicates the results.

TABLE II [1]

| | Elongation at Break | Yield Stress, p.s.i. | Stress at Break, p.s.i. |
| --- | --- | --- | --- |
| Temperature: | | | |
| 70 | 395 | 550 | 1,100 |
| 70 | 370 | 550 | 880 |
| 40 | 260 | 920 | 1,050 |
| 40 | 260 | 970 | 1,100 |
| 40 | 545 | 850 | 1,430 |
| 0 | 200 | 1,250 | 1,750 |

[1] The polymer was a 50/50 mol ratio propene/butene copolymer having a molecular weight of 1.5 M; 30 weight percent of the polymer was used with 160/165 AMP.

Not only do the compositions of this invention have excellent physical properties as demonstrated by good elongation and flexibility at low temperatures, but the compositions show good adhesion to aluminum. A 1-mil film of wax-copolymer composition was coated on to 1-mil thick aluminum foil as follows. One inch wide strips were placed on a flat steel plate at room temperature. The molten wax-polymer blend was placed at one end of the strip and drawn down quickly along the length of the strip with a doctor-blade adjusted to give a film approximately 1 to 2 mils thick.

The tensile properties of the sample were determined as previously described. The adhesion was determined as follows. An uncoated aluminum strip was placed against the coated surface of one of the coated aluminum strips described above. The "sandwich" was placed on a heated (350° F.) metal surface and a Teflon covered metal bar (at approximately 2 p.s.i.) was placed on the sandwich for two seconds. The strips were allowed to cool to room temperature (73° F.), then pulled on an Instron tester using a crossarm speed of 5 inches per minute. The following table indicates the results.

TABLE III

| C₃/C₄, Mol Ratio | Polymer M.W.×10⁶ | Weight Percent | Elongation at Break, Percent | Adhesion to Aluminum, gms./inch | Stress at Break, p.s.i. | Film Thickness, mils |
| --- | --- | --- | --- | --- | --- | --- |
| 50/50 | ~1.0 | 20 | 60 | 150 | 550 | 1 |
| | | 30 | 120 | 230 | 1,300 | 1 |
| 25/75 | ~1.0 | 30 | 93 | { 180, 230, 250 } | { 1,150 } | 2, 5 |

It is evident from the previous tables that strong films having major amounts of wax may be obtained which have good strength properties, permitting them to be used as packaging; that flexibility, elongation under stress and low temperature properties all make the films prepared from the compositions of this invention useful for a wide variety of packaging purposes. Moreover, as evidenced by their adhesion to aluminum, the compositions of this invention can be readily applied to a variety of surfaces to provide waterproofing, a protective coating, etc.

As will be evident to those skilled in the art, various modifications on this invention can be made or followed, in the light of the foregoing disclosure and discussion, without departing from the spirit or scope of the disclosure or from the scope of the following claims.

We claim:

1. A method for preparing self-sustaining wax films comprising mechanically combining wax having an AMP in the range of 125 to 220 with from 20 to 55 weight percent of the total composition of propene-(1-butene) Ziegler-type copolymer having from 15 to 85 mole percent propene and of a molecular weight in the range of about 150,000 to 2,000,000 and extruding as a film the wax-copolymer mixture at a temperature in the range from about 350°–500° F., and rapidly cooling the extrudate to form a self-sustaining film.

2. A method according to claim 1 wherein the propene mole percent is in the range of 25 to 75 and the copolymer molecular weight is in the range of 500,000 to 1,500,000.

3. A non-blooming, self-sustaining film of a thickness in the range of 0.1 to 20 mils consisting essentially of 20 to 55 weight percent of a Ziegler-type copolymer of propene and 1-butene having from 15 to 85 mole percent propene and of a molecular weight in the range of about 150,000 to 2,000,000 and from 45 to 80 percent wax having an AMP of from about 125 to 200 and from 0 to 10 weight percent of polymer additives.

4. A film according to claim 3 wherein said copolymer has from 25 to 75 mole percent propene, a molecular weight in the range of about 500,000 to 1,500,000 and said film has from 50 to 70 weight percent wax and from 30 to 50 weight percent of said copolymer.

5. A composite film comprised of a film according to claim 3 bonded to an aluminum film.

6. A composite film comprising a film according to claim 3 bonded to a paper sheet.

References Cited

UNITED STATES PATENTS

| | | | |
|---|---|---|---|
| 2,728,735 | 12/1955 | Anderson | 260—28.5 |
| 2,911,384 | 11/1959 | Thompson | 260—28.5 |
| 3,042,640 | 7/1962 | Gersic | 260—28.5 |
| 3,030,322 | 4/1962 | Schrader | 260—28.5 |
| 3,084,128 | 2/1963 | Stillwagon | 260—28.5 |
| 3,210,305 | 10/1965 | Coenen | 260—28.5 |
| 3,322,708 | 5/1967 | Wilson | 260—28.5 |
| 3,326,834 | 6/1967 | Signorelli | 260—28.5 |
| 3,326,835 | 6/1967 | Signorelli | 260—28.5 |

JULIUS FROME, *Primary Examiner.*